US011010590B2

(12) United States Patent
Aragaki

(10) Patent No.: US 11,010,590 B2
(45) Date of Patent: May 18, 2021

(54) IMAGE PROCESSING DEVICE, CELL-CLUSTER RECOGNITION APPARATUS, CELL-CLUSTER RECOGNITION METHOD, AND CELL-CLUSTER RECOGNITION PROGRAM FOR BINARIZING AND SEGMENTING SMOOTHED CELL IMAGE IN WHICH GAP BETWEEN CELLS IN EACH CELL CLUSTER IS FILLED IN

(71) Applicant: OLYMPUS CORPORATION, Tokyo (JP)

(72) Inventor: Hideya Aragaki, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 70 days.

(21) Appl. No.: 16/122,185

(22) Filed: Sep. 5, 2018

(65) Prior Publication Data

US 2019/0095679 A1 Mar. 28, 2019

(30) Foreign Application Priority Data

Sep. 25, 2017 (JP) .............................. JP2017-183167

(51) Int. Cl.
*G06K 9/46* (2006.01)
*G06T 7/11* (2017.01)
(Continued)

(52) U.S. Cl.
CPC ....... *G06K 9/0014* (2013.01); *G06K 9/00134* (2013.01); *G06K 9/344* (2013.01); *G06K 9/44* (2013.01); *G06K 9/4638* (2013.01); *G06T 5/009* (2013.01); *G06T 7/11* (2017.01); *G06T 7/187* (2017.01); *G06T 2207/10056* (2013.01); *G06T 2207/10064* (2013.01); *G06T 2207/20208* (2013.01); *G06T 2207/30024* (2013.01)

(58) Field of Classification Search
None
See application file for complete search history.

(56) References Cited

U.S. PATENT DOCUMENTS

2009/0213214 A1 8/2009 Yamada
2013/0064422 A1* 3/2013 Ogi .................. G06K 9/342
382/103
(Continued)

FOREIGN PATENT DOCUMENTS

JP H09-140397 A 6/1997
JP 2009-175334 A 8/2009
(Continued)

*Primary Examiner* — Tahmina N Ansari
(74) *Attorney, Agent, or Firm* — Scully, Scott, Murphy & Presser, P.C.

(57) ABSTRACT

Provided is an image processing device including: a processor comprising hardware, the processor configured to: smooth a brightness value of a cell image including a plurality of cell clusters each including a plurality of cells so as to generate a smoothed image in which a gap existing between the cells in each of the cell clusters is filled in; binarize the smoothed image into a background region and a non-background region of each cell cluster; and segment the non-background region of the binarized smoothed image into a region for each of the cell clusters.

19 Claims, 12 Drawing Sheets

(51) Int. Cl.
*G06T 7/187* (2017.01)
*G06K 9/00* (2006.01)
*G06K 9/34* (2006.01)
*G06K 9/44* (2006.01)
*G06T 5/00* (2006.01)

(56) References Cited

U.S. PATENT DOCUMENTS

2014/0220592 A1   8/2014  Fujimoto et al.
2019/0095679 A1*  3/2019  Aragaki .................. G06K 9/44
2019/0272638 A1*  9/2019  Mouton .................. G06T 5/002

FOREIGN PATENT DOCUMENTS

| | | |
|---|---|---|
| JP | 2013-057595 A | 3/2013 |
| JP | 2014-149235 A | 8/2014 |
| JP | 2015-029504 A | 2/2015 |
| WO | WO 2014/171382 A1 | 10/2014 |

* cited by examiner

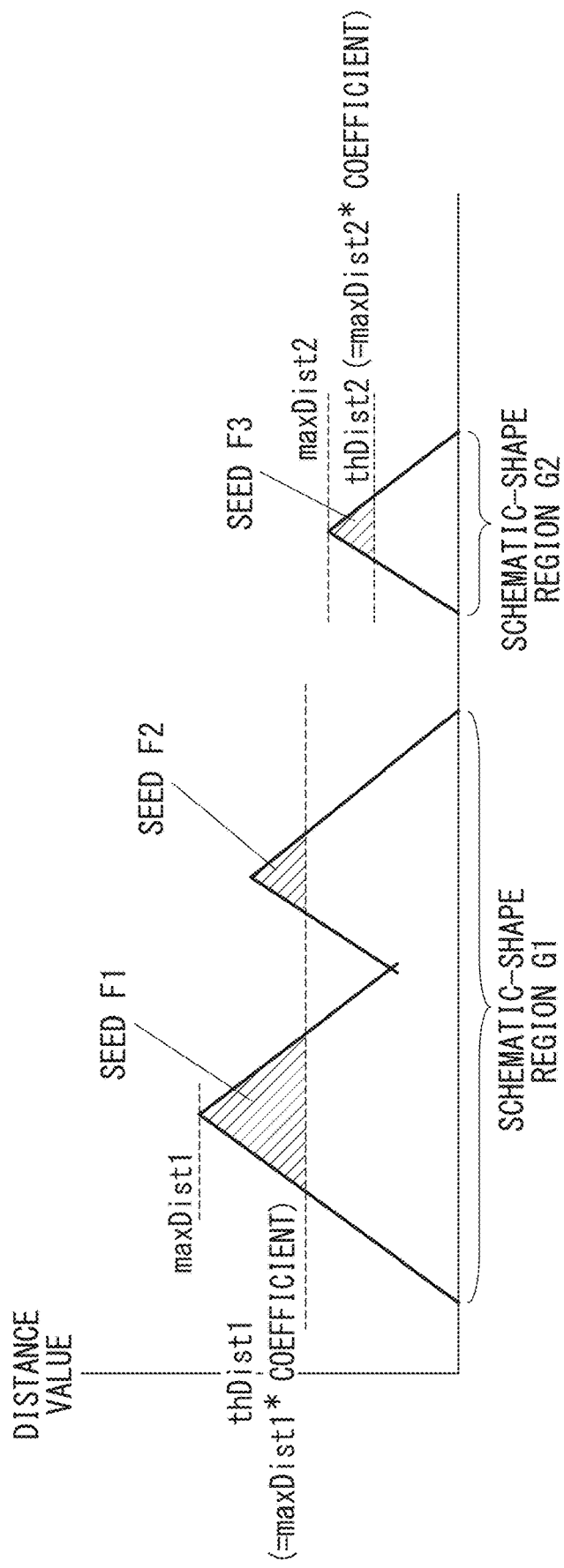

IMAGE PROCESSING DEVICE, CELL-CLUSTER RECOGNITION APPARATUS, CELL-CLUSTER RECOGNITION METHOD, AND CELL-CLUSTER RECOGNITION PROGRAM FOR BINARIZING AND SEGMENTING SMOOTHED CELL IMAGE IN WHICH GAP BETWEEN CELLS IN EACH CELL CLUSTER IS FILLED IN

CROSS-REFERENCE TO RELATED APPLICATIONS

This application claims the benefit of Japanese Patent Application No. 2017-183167, the content of which is incorporated herein by reference.

TECHNICAL FIELD

The present invention relates to an image processing device, a cell-cluster recognition apparatus, a cell-cluster recognition method, and a cell-cluster recognition program that extract a cell cluster, which is a plurality of cells grouped into a cluster, from a cell image acquired using, for example, a fluorescence microscope.

BACKGROUND ART

In the fields of medical and life science, various cell analyses have been carried out using cell images acquired with a microscope. In research on stems cells, such as Embryonic Stem Cells (ES cells) and Induced Pluripotent Stem Cells (iPS cells), in order to elucidate the cell differentiation mechanism, develop new drugs, and so forth, the work of observing the cell differentiation process and changes in cell morphological features, examining the differences in properties among cells, and so forth is generally carried out using a plurality of cell images that have been acquired time-sequentially. Moreover, for the purpose of, for example, studying the effects of, for example, a drugs in an environment that more closely approximates the environment in a living body, three-dimensional culture in which cells are cultured in the form of a three-dimensional object has been performed.

In the related art, In order to check the cultivation state of a cell cluster, which is a plurality of cells grouped into a cluster, analyses are performed manually by researchers. However, this involves an enormous amount of time and effort due to, for example, the complexity of the three-dimensional analysis and the complicated structure to be processed. In recent years, an image analysis technology has been applied, so that the three-dimensional analysis is automated and each cell cluster included in a cell image is automatically detected, whereby morphological information about cell clusters and the number thereof can be ascertained efficiently (for example, see Patent Literature 1).

Patent Literature 1 discloses a technology for providing a calibration method for improving the accuracy of a process for estimating the volume of a cell cluster from an image including the cell cluster. The method involves extracting pixels with a density higher than a preset threshold value from image data so as to extract a cell cluster (object) region from the image.

CITATION LIST

Patent Literature

{PTL 1}
Japanese Unexamined Patent Application, Publication No. 2014-149235

SUMMARY OF INVENTION

One aspect of the present invention is an image processing device including: a processor comprising hardware, the processor configured to: smooth a brightness value of a cell image including a plurality of cell clusters each including a plurality of cells so as to generate a smoothed image in which a gap existing between the cells in each of the cell clusters is filled in; binarize the smoothed image into a background region and a non-background region of each cell cluster; and segment the non-background region of the binarized smoothed image into a region for each of the cell clusters.

Another aspect of the present invention is a cell-cluster recognition apparatus including: an image acquisition device that is configured to acquire a cell image formed by capturing an image of a plurality of cell clusters each including a plurality of cells; and an image processing device that includes a processor configured to: smooth a brightness value of the cell image acquired by the image acquisition device so as to generate a smoothed image in which a gap existing between the cells in each of the cell clusters is filled in; binarize the smoothed image into a background region and a non-background region of each cell cluster; and segment the non-background region of the binarized smoothed image into a region for each of the cell clusters.

Another aspect of the present invention is a cell-cluster recognition method including: smoothing a brightness value of a cell image including a plurality of cell clusters each including a plurality of cells so as to generate a smoothed image in which a gap existing between the cells in each of the cell clusters is filled in; binarizing the smoothed image into a background region and a non-background region of each cell cluster; and segmenting the non-background region of the binarized smoothed image into a region for each of the cell clusters.

Another aspect of the present invention is a non-transitory computer-readable medium having a cell-cluster recognition program stored thereon, the cell-cluster recognition program causing a computer to execute functions of: smoothing a brightness value of a cell image including a plurality of cell clusters each including a plurality of cells so as to generate a smoothed image in which a gap existing between the cells in each of the cell clusters is filled in; binarizing the smoothed image into a background region and a non-background region of each cell cluster; and segmenting the non-background region of the binarized smoothed image into a region for each of the cell clusters.

BRIEF DESCRIPTION OF DRAWINGS

FIG. 13 illustrates a one-dimensional example of threshold processing performed by a seed creating unit.

DESCRIPTION OF EMBODIMENTS

First Embodiment

An image processing device, a cell-cluster recognition apparatus, a cell-cluster recognition method, and a cell-cluster recognition program according to a first embodiment of the present invention will be described below with reference to the drawings.

Figure 1:
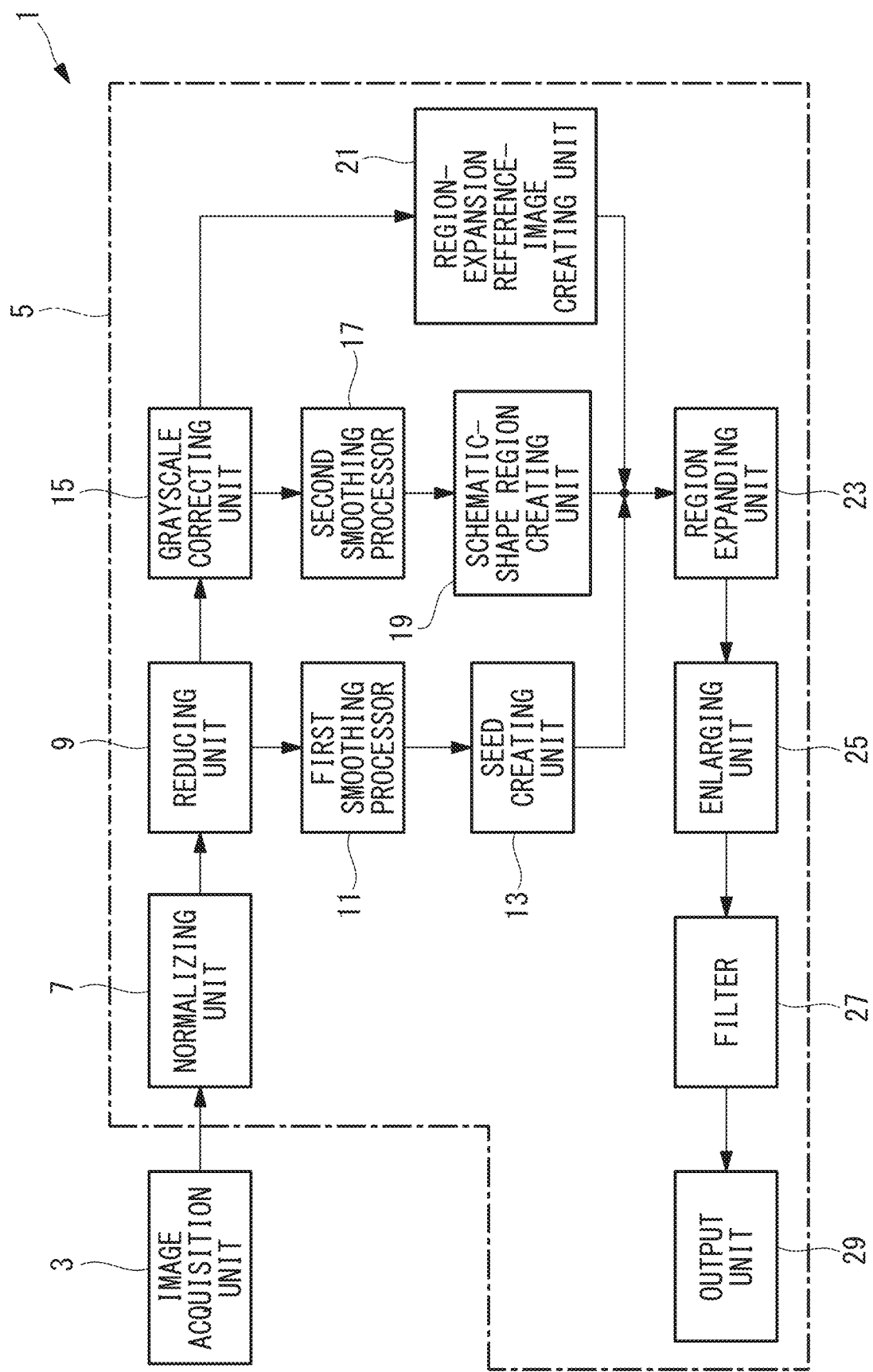
FIG. 1 is a block diagram illustrating the configuration of a cell-cluster recognition apparatus according to a first embodiment of the present invention.

As shown in FIG. 1, a cell-cluster recognition apparatus 1 according to this embodiment includes an image acquisition device (image acquisition unit) 3 that acquires a cell image formed by capturing an image of a plurality of cell clusters each including a plurality of cells, and also includes an image processing device 5 that processes the cell image acquired by the image acquisition device 3.

The image acquisition device 3 includes an image acquisition element such as a CCD that acquires a cell image captured by a fluorescence microscope and an A/D converter that converts the cell image acquired by the image acquisition element into a digital signal (neither of which are shown), and outputs, for example, a 16-bit (0-65535 grayscale) original image signal.

The image acquisition device 3 can capture a plurality of cell images at preset intervals in the vertical direction and can output three-dimensional z-stack image data constituted of a set of the plurality of cell images as an original image signal. In the following description, the vertical direction will be referred to as a Z direction, and the horizontal directions that are orthogonal to the Z direction and that are orthogonal to each other will be referred to as an X direction and a Y direction, respectively.

Figure 2:
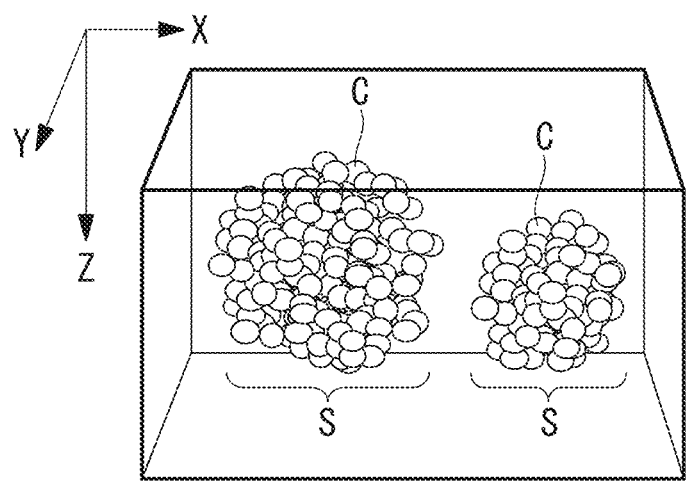
FIG. 2 illustrates an example of cell clusters (spheroids) each including cells aggregated three-dimensionally into a cluster.
Figure 3A:
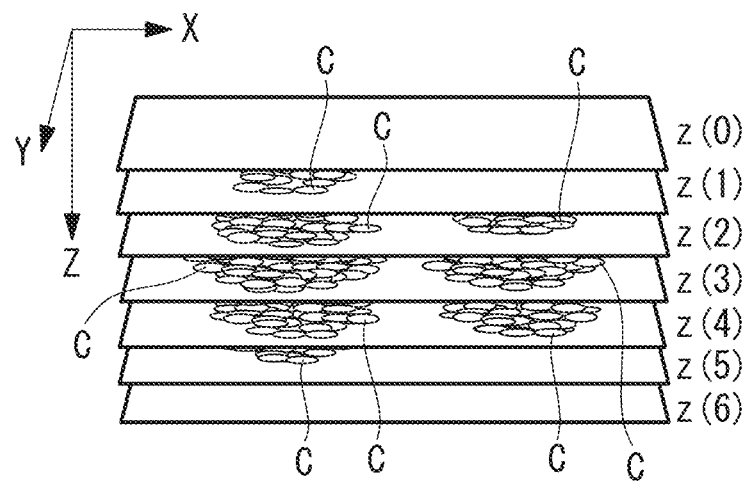
FIG. 3A illustrates an example of z-stack image data constituted of a set of a plurality of images formed by capturing an image of the cell clusters at 5-μm intervals in the Z direction.
Figure 3B:
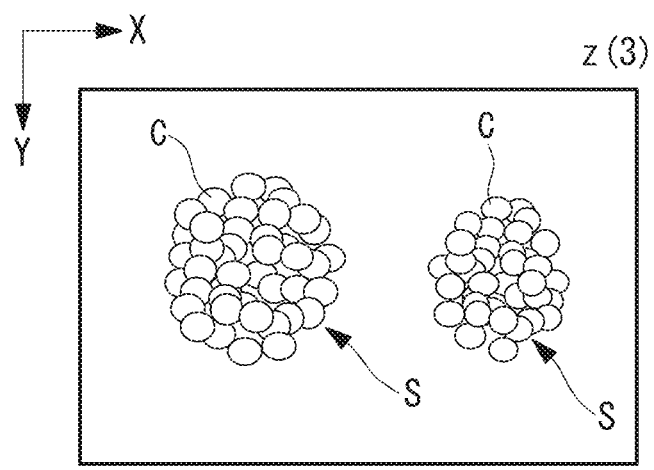
FIG. 3B illustrates an example of a cross-sectional (sliced) image taken at a depth Z=z(3) within the z-stack image data.

FIG. 2 illustrates spheroids as an example of cell clusters, each of which includes cells aggregated three-dimensionally into a cluster. FIG. 3A illustrates an example of z-stack image data constituted of a set of a plurality of images formed by capturing an image of the spheroids at predetermined intervals, and FIG. 3B illustrates an example of a cross-sectional (sliced) image taken at a depth Z=z(3) included in the z-stack image data. A single stack (i.e., two-dimensional image data at a depth of 1 in the Z direction) is also processable. In FIGS. 2, 3A, and 3B, reference sign C denotes a cell, and reference sign S denotes a spheroid. The original image signal output from the image acquisition device 3 is forwarded to the image processing device 5.

As shown in FIG. 1, the image processing device 5 includes a normalizing unit 7, a reducing unit 9, a first smoothing processor (smoothing unit) 11, a seed creating unit (binarizing unit) 13, a grayscale correcting unit 15, a second smoothing processor (smoothing unit) 17, a schematic-shape-region creating unit 19, a region-expansion reference-image creating unit 21, a region expanding unit (region segmenting unit) 23, an enlarging unit 25, a filter (measuring unit, filtering unit) 27, and an output unit 29. These units are connected to and operationally controlled by a system controller (not shown). Moreover, these units may be constituted of, for example, a central processing unit (CPU) and a storage device that stores a computational program therein, such as a random access memory (RAM) and a read-only memory (ROM). In this case, the ROM may store a cell-cluster recognition program as the computational program.

The normalizing unit 7 reads an original image signal (three-dimensional z-stack image data), which is formed by capturing an image of a cell cluster (spheroid S), sent from the image acquisition device 3 and normalizes each pixel value within a predetermined grayscale range, such as a 12-bit (0-4095 grayscale) range, so as to generate a normalized image. The normalization process is performed in accordance with, for example, a histogram spreading process.

The procedure of the histogram spreading process involves determining a minimum brightness value levelMin and a maximum brightness value levelMax in the original image signal (three-dimensional z-stack image data), and subsequently multiplying all pixel values by a gain g (=4095/(levelMax−levelMin)). A mechanism used by a user for arbitrarily setting the aforementioned parameters levelMin and levelMax may be provided such that the expansion range of the normalization process is freely adjustable. The normalized image normalized to 12 bits by the normalizing unit 7 is forwarded to the reducing unit 9.

The reducing unit 9 generates a reduced image by subjecting the normalized image sent from the normalizing unit 7 to size conversion (i.e., a reduction process), which is intended for reducing the amount of data to be processed for speeding up the process. Specifically, based on a preset size reduction rate (e.g., 0.5) for each of the X, Y, and Z directions, the reducing unit 9 applies a known reduction-interpolation process (e.g., a bilinear interpolation process) to the normalized image. The image reduced by the reducing unit 9 is forwarded to the first smoothing processor 11 and the grayscale correcting unit 15.

As preprocessing of the processing to be performed by the seed creating unit 13, the first smoothing processor 11 performs a Gaussian smoothing process on the reduced image sent from the reducing unit 9 so as to fill in the gaps between the individual cells within the cell cluster region (cluster region), thereby generating a smoothed image. By performing the Gaussian smoothing process, small protrusions and recesses in the reduced image may be smoothed or small soiled regions may be removed therefrom. Although smoothing is advantageous in that the gaps between the cells can be readily filled in, too much smoothing may possibly cause neighboring cluster regions to connect to each other and thus result in failed seed formation. Therefore, it is necessary to appropriately adjust the degree of smoothing.

The effect of the Gaussian smoothing filter of the first smoothing processor 11 is adjusted (i.e., the reference deviation σ value is adjusted) so as to be proportional to the optical magnification, which is an image acquisition condition. Specifically, the effect is adjusted such that stronger smoothing is applied as the magnification increases, that is, as the actual size of a cell cluster or cells serving as a subject relatively increases. The image smoothed by the first smoothing processor 11 is forwarded to the seed creating unit 13.

By performing known brightness-value-based threshold processing, the seed creating unit 13 creates a seed (i.e., an initial region) for each cluster region such that the seed has a one-to-one correspondence relationship therewith, as much as possible. When creating a seed, it is not necessary to ensure the accuracy of the regional shape of the seed itself, unlike when creating a schematic-shape region to be described later.

The seed creating unit 13 first calculates a binarization threshold value by applying a known threshold processing technique, such as the Otsu method, which is one adaptive threshold setting technique, to the smoothed image sent from the first smoothing processor 11. Then, the seed creating unit 13 uses the calculated binarization threshold value to perform a binarization process for binarizing the smoothed image into a background region and a non-background region of the cluster region. Then, the seed creating unit 13 performs a labeling process on a higher-brightness region (i.e., the non-background region) with a brightness higher than or equal to the threshold value after the binarization, so as to set a unique label (i.e., a region number) to each non-background region existing spatially independently within the image and to set the non-background region with the set label as a seed.

The Otsu method involves adaptively setting a binarization threshold value based on a brightness value histogram of the image such that, when a histogram is separated into two based on a predetermined threshold value, the degree of separation defined based on each separated histogram is maximized. Alternatively, the binarization threshold value may be arbitrarily adjusted by the user. The seed created by the seed creating unit 13 is forwarded to the region expanding unit 23.

As preprocessing of the processing to be performed by the second smoothing processor 17 and the schematic-shape-region creating unit 19, the grayscale correcting unit 15 performs a grayscale tone correction process on the reduced image sent from the reducing unit 9 so as to generate a grayscale-corrected image in which low to intermediate brightness values within the image are increased. A known technique may be used as the grayscale tone correction process. In this embodiment, an adaptive grayscale tone correction process according to a histogram equalization technique is applied.

The adaptive grayscale tone correction process according to the histogram equalization technique is for effectively performing the smoothing process, to be described later, by the schematic-shape-region creating unit 19 on low to intermediate brightness values. Because the gaps between the cells in a cell cluster often have low to intermediate brightness values that are higher than the background and lower than the cells, there is an advantage in that the pixel values within the cell cluster can be made even and uniform by increasing the brightness values of the low to intermediate brightness sections corresponding to these gaps between the cells.

This adaptive grayscale tone correction process involves performing conversion of pixel values such that the occurrence rate (i.e., the pixel count) of each pixel value related to the brightness-value histogram is made uniform as much as possible. Specifically, a pixel-value conversion lookup table (LUT) based on a cumulative histogram is created from the brightness-value histogram, and the created pixel-value conversion lookup table is applied to all pixels in accordance with expression (1).

$$Pdst = LUT(Psrc) \qquad (1)$$

where Psrc denotes a pixel value before the process, and Pdst denotes a pixel value after the process.

Figure 4:
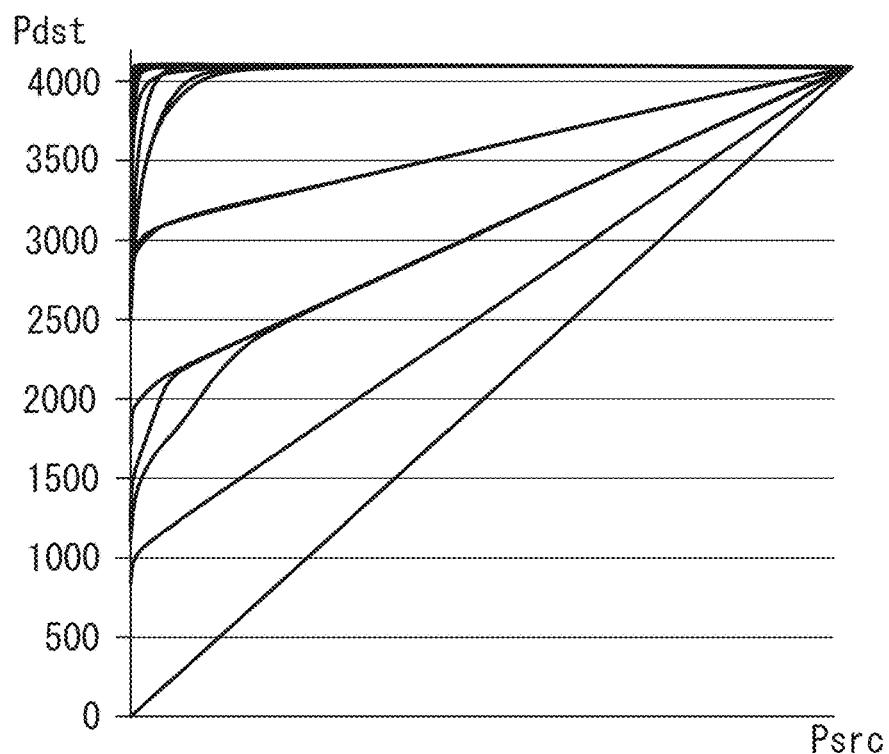
FIG. 4 illustrates an example of a conversion table used in a grayscale tone correction process according to a histogram equalization technique.

FIG. 4 illustrates an example of a conversion table used in the grayscale tone correction process according to the histogram equalization technique. In FIG. 4, the ordinate axis indicates a pixel value (Pdst) after the process, whereas the abscissa axis indicates a pixel value (Psrc) before the process. The same applies to FIG. 5.

Instead of the adaptive grayscale tone correction process, the grayscale tone correction process may be such that adjustment can be arbitrarily made by the user. For example, the grayscale tone correction process may be performed by applying gamma-curve-based pixel-value conversion to all pixels, as in expression (2) equivalent to gamma correction. In this case, the user may arbitrarily change a gamma value coefGamma as an input parameter in accordance with expression (2) so that the correction effect is freely adjustable.

$$Pdst = Psrc^{(1/coefGamma)} \qquad (2)$$

Figure 5:
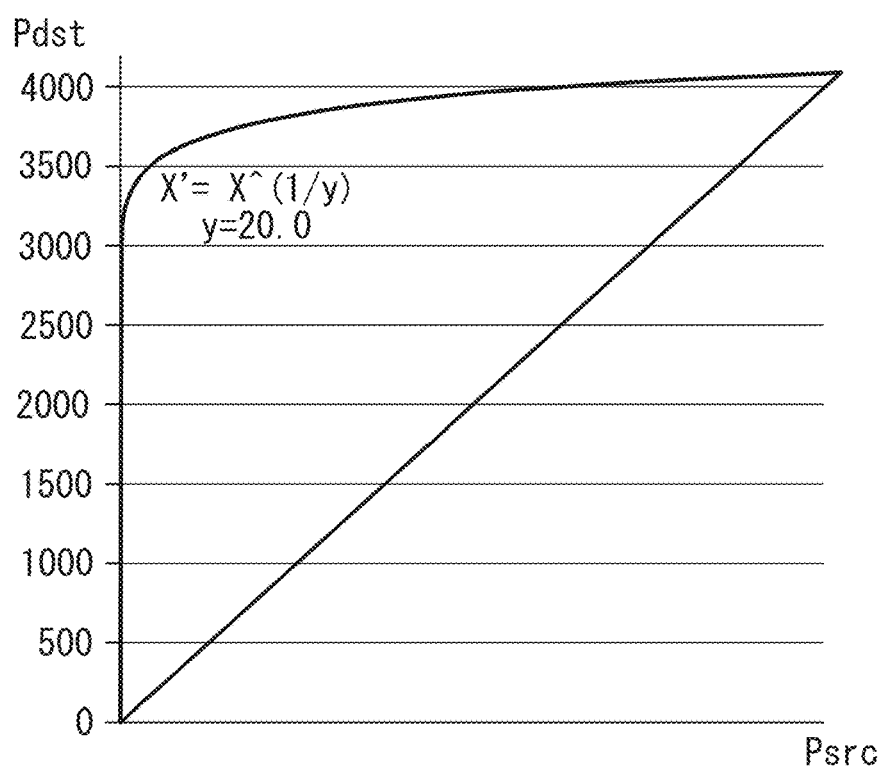
FIG. 5 illustrates an example of a gamma correction curve.

FIG. 5 illustrates an example of a gamma correction curve.

The image grayscale-corrected by the grayscale correcting unit 15 is forwarded to the second smoothing processor 17 and the region-expansion reference-image creating unit 21.

As preprocessing of the processing performed by the schematic-shape-region creating unit 19, the second smoothing processor 17 performs a smoothing process on the grayscale-corrected image sent from the grayscale correcting unit 15 so as to generate a smoothed image. The smoothing process performed by the second smoothing processor 17 may basically be the same process as the smoothing process performed by the first smoothing processor 11, such that the smoothing process may be performed using a similar reference deviation σ value of the Gaussian smoothing process in the first smoothing processor 11. The image smoothed by the second smoothing processor 17 is forwarded to the schematic-shape-region creating unit 19.

The schematic-shape-region creating unit 19 performs brightness-value-based threshold processing on the smoothed image sent from the second smoothing processor 17 so as to create a schematic-shape region expressing the schematic shape of each cluster region. In this case, unlike the threshold setting process performed when creating a seed in the seed creating unit 13, the individual cluster regions do not necessarily need to be spatially independent of each other. The cluster regions may be adjacent and connected to each other, but it is necessary to set a threshold value so that the shape of each cluster region can be formed accurately as much as possible. Moreover, the schematic-shape-region creating unit 19 may perform a gap filling process for filling in gaps existing within the formed schematic-shape region. The schematic-shape region created by the schematic-shape-region creating unit 19 is forwarded to the region expanding unit 23.

The region-expansion reference-image creating unit 21 creates a region-expansion reference image for defining an expansion range of each cluster region to be referred to when the region expanding unit 23 performs a region expansion process, which will be described later. Specifically, the region-expansion reference-image creating unit 21 performs a smoothing process on the grayscale-corrected image sent from the grayscale correcting unit 15 so as to smooth protrusions and recesses within the cell cluster and to fill in gaps existing between the cells.

The smoothing process performed by the region-expansion reference-image creating unit 21 is basically the same as the Gaussian smoothing process performed by the first smoothing processor 11. However, with regard to a brightness value to be referred to when the region expanding unit 23 performs the region expansion process, a flat image with a smaller brightness variation within the cluster region (and with a steep brightness variation as much as possible along the region boundary) is ideal, and stronger smoothing is necessary. In the smoothing process performed by the region-expansion reference-image creating unit 21, for example, a reference deviation $\sigma 2$ ($=2.0 \times \sigma 1$) twice as large as a reference deviation $\sigma 1$ for the Gaussian smoothing process in the first smoothing processor 11 is set. The region-expansion reference image created by the region-expansion reference-image creating unit 21 is forwarded to the region expanding unit 23.

The region expanding unit 23 uses the seed sent from the seed creating unit 13, the schematic-shape region sent from the schematic-shape-region creating unit 19, and the region-expansion reference image sent from the region-expansion reference-image creating unit 21 to perform a region segmentation process according to a predetermined region expansion technique, thereby generating a region-segmented image. As a region segmentation technique, a known technique may be used. In this embodiment, a cluster region is formed in accordance with a marker-controlled Watershed region segmentation technique.

A Watershed region segmentation technique involves viewing a brightness variation in an image as a "mountain" and a "valley" and forming a region such that the "watershed" is a region boundary line. The marker-controlled Watershed technique involves first setting seeds as markers, causing each seed to develop while taking into consideration the brightness variation of pixels around each seed in the region-expansion reference image and the smoothness thereof, and finally segmenting each cluster region such that the watershed section of the brightness is the region boundary. Thus, the number of segmented cluster regions (i.e., the number of seeds) can be set in advance. Furthermore, as a seed expandable range, the region expansion range of each seed is limited to within the schematic-shape region sent from the schematic-shape-region creating unit 19, so that the ultimate segmentation (expansion) result matches the schematic-shape region.

Figure 6:
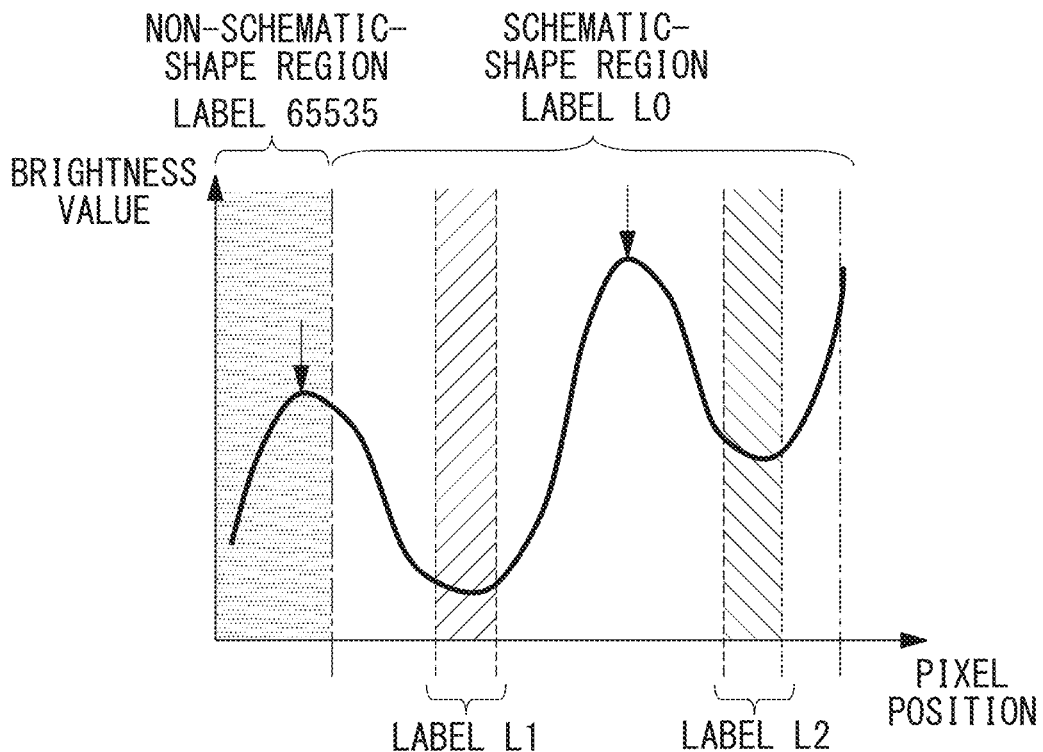
FIG. 6 schematically illustrates marker-controlled Watershed region segmentation prior to region segmentation.
Figure 7:
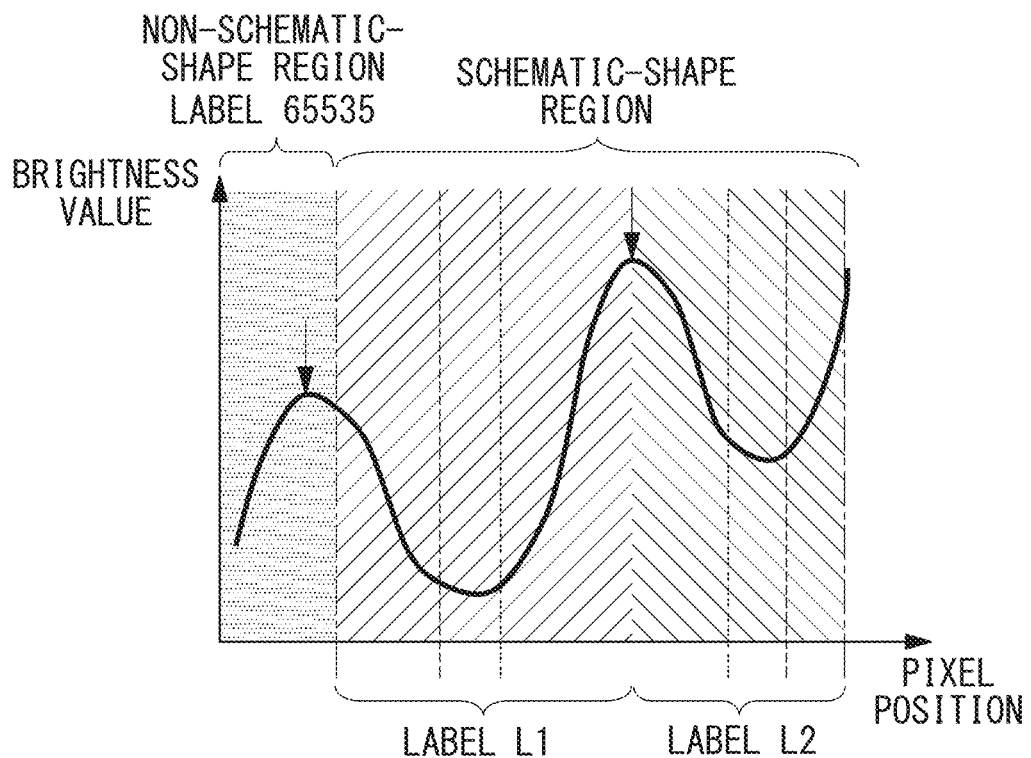
FIG. 7 schematically illustrates marker-controlled Watershed region segmentation after each seed is expanded.

FIGS. 6 and 7 illustrate examples of one-dimensional data region-expanded in accordance with the marker-controlled Watershed technique. FIG. 6 illustrates a state prior to the region segmentation and is a graph indicating a one-dimensional variation (light and shade) of a brightness value. In the graph, a label 65535 is set for a region corresponding to a region outside the schematic-shape region, that is, a non-schematic-shape region. Otherwise, the schematic-shape region corresponds to a region expandable range and has a label L0 set therefor. Moreover, labels L1 and L2 indicating two seeds are set.

FIG. 7 illustrates a region segmentation result after each seed is expanded. It is clear that the seeds with the labels L1 and L2 set in FIG. 6 expand the range relative to the region with the label L0, and that each seed is ultimately in contact with the boundary with the non-schematic-shape region or with the watershed (i.e., the peak of the brightness graph) so that the regions serving as the cluster regions are defined. The region expanding unit 23 may perform a gap filling process for filling in gaps existing within each formed cluster region. The image region-segmented by the region expanding unit 23 is forwarded to the enlarging unit 25.

The enlarging unit 25 performs size conversion (i.e., an enlargement process) for adjusting the size of the region-segmented image sent from the region expanding unit 23 to the size of the original image signal at the time of input. Specifically, based on a preset reduction rate, the enlarging unit 25 performs "inverse" conversion of the reduction process in accordance with a known interpolation process (e.g., bilinear interpolation process), that is, an enlargement process. The region-segmented image enlarged by the enlarging unit 25 is forwarded to the filter 27.

The filter 27 performs a filtering process with respect to the size (i.e., the number of pixels) of each cluster region in the region-segmented image sent from the enlarging unit 25. Specifically, the filter 27 calculates the number of pixels belonging to each cluster region so as to measure the size of the cluster region. Furthermore, if the calculated number of pixels is outside the range between a preset lower-limit threshold value (region threshold value) and a preset upper-limit threshold value, the filter 27 deletes the region from the region-segmented image. Accordingly, noise whose number of pixels is outside the range between the preset lower-limit threshold value and the preset upper-limit threshold value can be deleted. The region-segmented image filtered by the filter 27 is forwarded to the output unit 29.

Figure 8A:
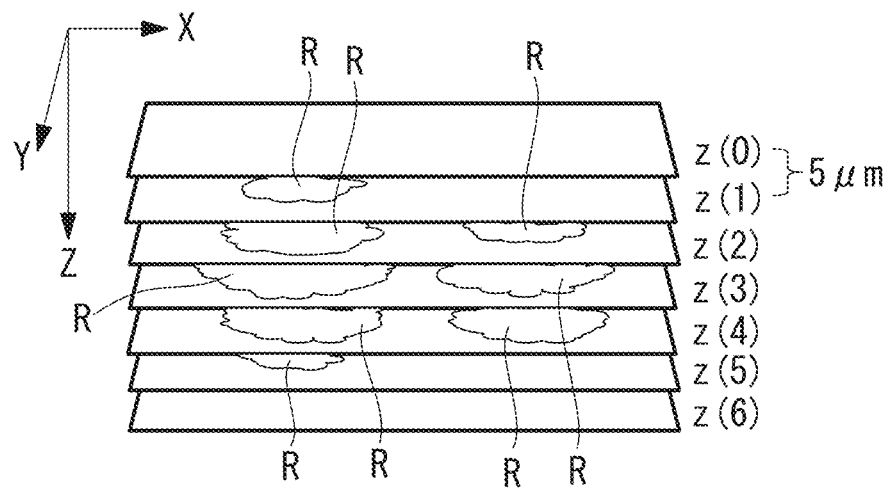
FIG. 8A illustrates an example of a region-segmented z-stack image of cell clusters.
Figure 8B:
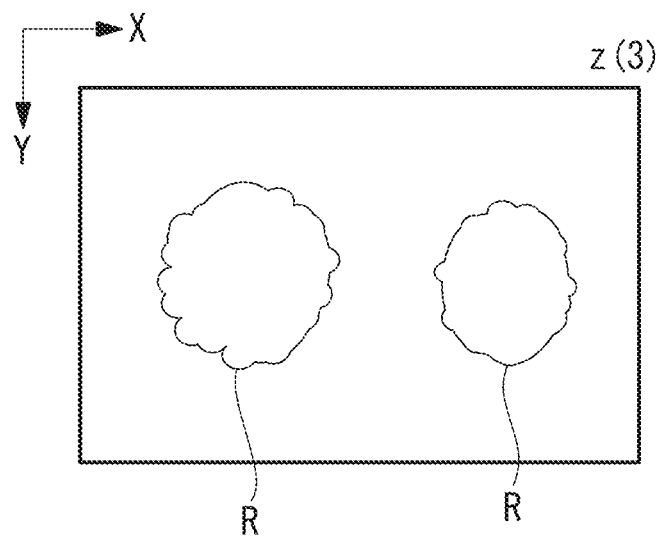
FIG. 8B illustrates a sliced image at a depth Z=z(3) in FIG. 8A.

The output unit 29 converts the filtered region-segmented image (z-stack image data) sent from the filter 27 into a predetermined image format, such as TIFF format, outputs the converted image as a region segmentation result in which each cell cluster is segmented as an individual region, and causes a recording medium, such as a flash memory, to store the image. FIG. 8A illustrates z-stack image data as an ultimately-generated region segmentation result, and FIG. 8B illustrates a sliced image of a predetermined cross section ($Z=z(3)$). In FIGS. 8A and 8B, reference sign R denotes a cluster region.

Next, the cell-cluster recognition method according to this embodiment will be described.

Figure 9:
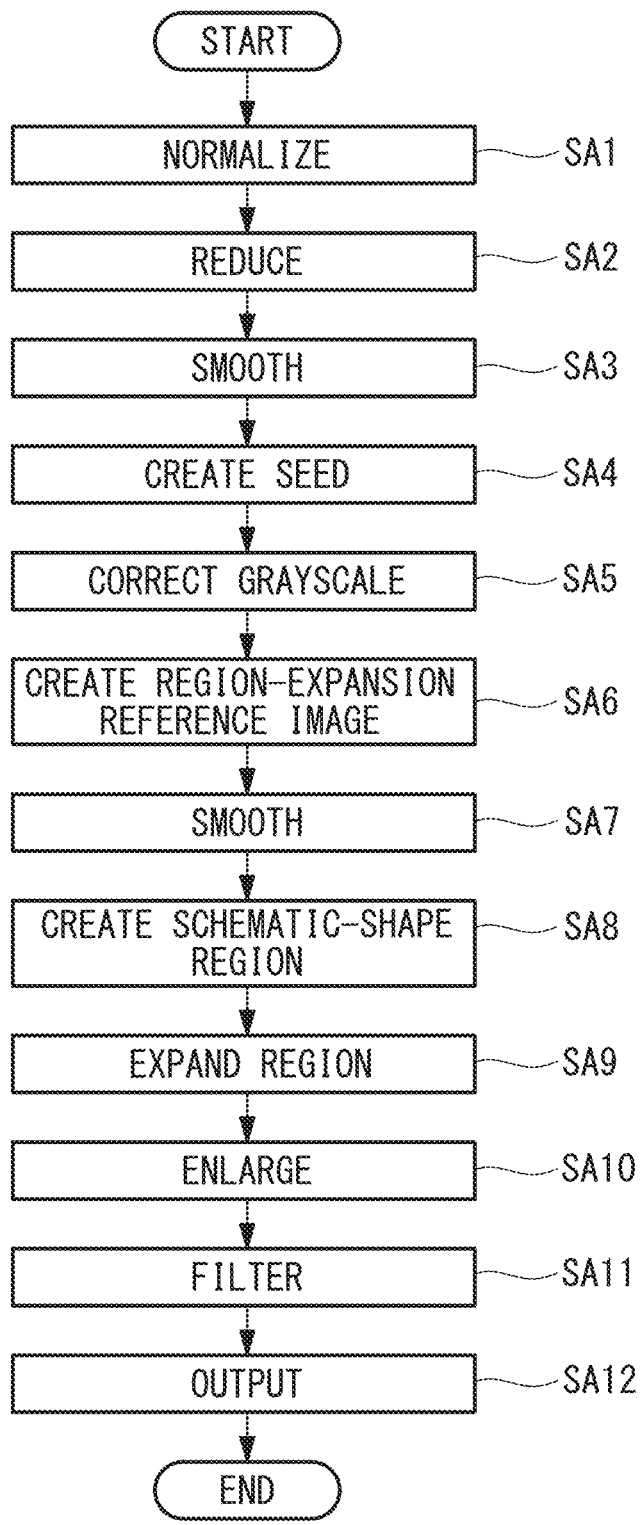
FIG. 9 is a flowchart illustrating a cell-cluster recognition method according to the first embodiment of the present invention.

As shown in a flowchart in FIG. 9, the cell-cluster recognition method according to this embodiment includes smoothing steps SA3 and SA7 for smoothing pixel values of a cell image including a plurality of cell clusters each formed of a plurality of cells so as to generate a smoothed image in which gaps existing between the cells in each cell cluster are filled in, a seed creating step (binarizing step) SA4 for binarizing the smoothed image into a background region and a non-background region of each cell cluster and creating a seed corresponding to each cluster region, and a region expanding step (region segmenting step) SA9 for causing the seed to develop and segmenting the non-background region of the smoothed image into a region for each cell cluster.

The effects of the image processing device 5 and the cell-cluster recognition apparatus 1 having the above-described configuration, and the cell-cluster recognition method will be described below.

As shown in a flowchart in FIG. 9, in order to recognize a cell cluster in accordance with the image processing device 5, the cell-cluster recognition apparatus 1, and the cell-cluster recognition method according to this embodiment, three-dimensional z-stack image data acquired by the image acquisition device 3 is input to the normalizing unit 7 of the image processing device 5 as an original image signal to be region-segmented.

Subsequently, the normalizing unit 7 normalizes the pixel values of the original image signal sent from the image acquisition device 3 within the 12-bit (0-4095 grayscale) range, so that a normalized image is generated (step SA1). Then, the normalized image generated by the normalizing unit 7 is forwarded to the reducing unit 9.

Subsequently, the reducing unit 9 applies a known reduction-interpolation process on the normalized image sent from the normalizing unit 7 based on the preset reduction rate, so that a reduced image having undergone the reduction process is generated (step SA2). The reduced image size-converted by the reducing unit 9 is forwarded to the first smoothing processor 11 and the grayscale correcting unit 15.

Figure 10A:
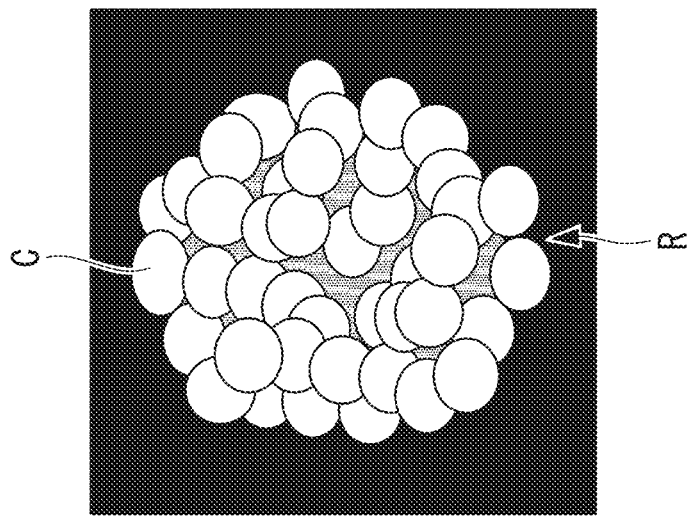
FIG. 10A illustrates an original image signal of a cell cluster prior to grayscale tone correction.
Figure 10B:
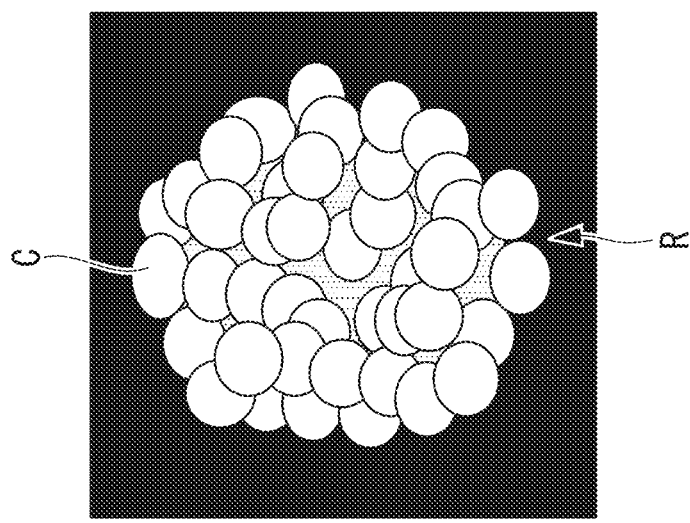
FIG. 10B illustrates a state where brightness values corresponding to gaps between cells are increased by performing a grayscale tone correction process on the original image signal.

Subsequently, the first smoothing processor 11 performs a Gaussian smoothing process on the reduced image sent from the reducing unit 9, as shown in FIG. 10A, so that a smoothed image in which gaps existing between individual cells within a cluster region are filled in is generated, as shown in FIG. 10B (step SA3). Then, the smoothed image generated by the first smoothing processor 11 is forwarded to the seed creating unit 13. In FIGS. 10A and 10B, reference sign R denotes a cluster region. The same applies to FIG. 10C.

Figure 10C:
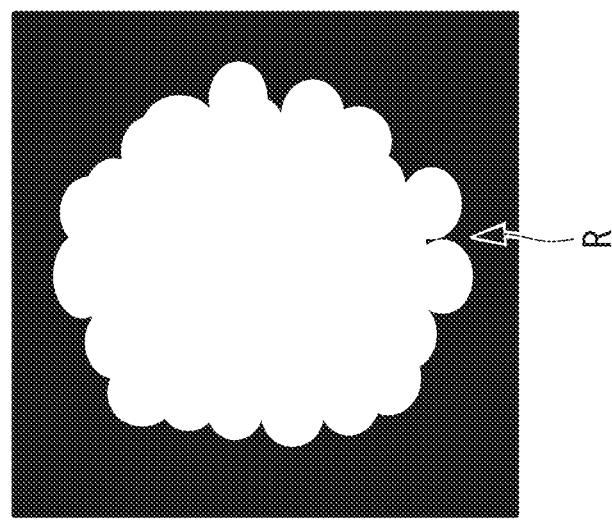
FIG. 10C illustrates a state where a binarization process has been performed on the image signal in FIG. 10B.

Subsequently, the seed creating unit 13 binarizes the smoothed image sent from the first smoothing processor 11 into a background region and a non-background region of the cluster region in accordance with known brightness-value-based threshold processing using a binarization threshold value, as shown in FIG. 10C. In this case, the gaps existing between the cells within the cluster region in the smoothed image are filled in by the first smoothing processor 11, so that the smoothed image can be binarized accurately into the background region and the non-background region.

Then, the seed creating unit 13 performs a labeling process on the non-background region so as to create a seed (i.e., an initial region) for each cluster region such that the seed has a one-to-one correspondence relationship therewith as much as possible (step SA4). The seed created by the seed creating unit 13 is forwarded to the region expanding unit 23.

Furthermore, the grayscale correcting unit 15 performs a grayscale interpolation process on the reduced image sent from the reducing unit 9 so as to generate a grayscale-corrected image in which low to intermediate brightness values corresponding to the gaps between the cells in the cell cluster within the image are increased (step SA5). Then, the grayscale-corrected image generated by the grayscale correcting unit 15 is forwarded to the second smoothing processor 17 and the region-expansion reference-image creating unit 21.

Subsequently, the region-expansion reference-image creating unit 21 performs a smoothing process on the grayscale-corrected image sent from the grayscale correcting unit 15 so as to create a region-expansion reference image in which protrusions and recesses within the cluster region are smoothed and the gaps existing between the cells are filled in (step SA6). Then, the region-expansion reference image created by the region-expansion reference-image creating unit 21 is forwarded to the region expanding unit 23.

Furthermore, the second smoothing processor 17 performs a smoothing process, which is similar to that performed by the first smoothing processor 11, on the grayscale-corrected image sent from the grayscale correcting unit 15 so as to generate a smoothed image (step SA7). Then, the smoothed image generated by the second smoothing processor 17 is forwarded to the schematic-shape-region creating unit 19.

Subsequently, the schematic-shape-region creating unit 19 performs brightness-value-based threshold processing on the smoothed image sent from the second smoothing processor 17 so as to create a schematic-shape region expressing the schematic shape of each cluster region (step SA8). Then, the schematic-shape region created by the schematic-shape-region creating unit 19 is forwarded to the region expanding unit 23.

Subsequently, the region expanding unit 23 performs a region segmentation process on the seed sent from the seed creating unit 13 in accordance with a predetermined region expansion technique, in which the region expansion range is limited to within the schematic-shape region sent from the schematic-shape-region creating unit 19, while referring to the brightness variation of pixels around each seed in the region-expansion reference image sent from the region-expansion reference-image creating unit 21, thereby generating a region-segmented image in which a region is segmented for each cell cluster (step SA9). Then, the region-segmented image generated by the region expanding unit 23 is forwarded to the enlarging unit 25.

Subsequently, the enlarging unit 25 performs an enlargement process on the region-segmented image sent from the region expanding unit 23 so as to convert the region-segmented image back to the original image size at the time of input (step SA10). Then, the region-segmented image size-converted by the enlarging unit 25 is forwarded to the filter 27.

Subsequently, the filter 27 performs a filtering process with respect to the size (i.e., the number of pixels) of each cluster region in the region-segmented image sent from the enlarging unit 25, so that noise whose number of pixels is outside the range between the preset lower-limit threshold value and the preset upper-limit threshold value is deleted (step SA11). Then, the region-segmented image filtered by the filter 27 is forwarded to the output unit 29.

Subsequently, the output unit 29 outputs the region-segmented image sent from the filter 27 as a region segmentation result in which each cell cluster is segmented as an individual region, and causes the recording medium, such as a flash memory, to store the image (step SA12).

As described above, in the image processing device 5, the cell-cluster recognition apparatus 1, and the cell-cluster recognition method according to this embodiment, the first smoothing processor 11 generates a smoothed image in which the gaps within each cluster region are filled in, and the seed creating unit 13 binarizes the smoothed image into a background region and a non-background region of the cluster region so as to create a seed corresponding to each cluster region from the non-background region. Then, the region expanding unit 23 causes the seed to develop and segments the non-background region into regions for individual cell clusters. Consequently, a region of each cell cluster from which gaps between the cells have been removed can be readily extracted from a cell image formed by capturing an image of a plurality of cell clusters.

Second Embodiment

Next, an image processing device, a cell-cluster recognition apparatus, and a cell-cluster recognition method according to a second embodiment of the present invention will be described.

The image processing device, the cell-cluster recognition apparatus, and the cell-cluster recognition method according to this embodiment are different from those in the first embodiment in that a seed is created based on a schematic-shape region.

Components similar to those in the image processing device 5, the cell-cluster recognition apparatus 1, and the cell-cluster recognition method according to the first embodiment will be given the same reference signs, and descriptions thereof will be omitted.

Figure 11:
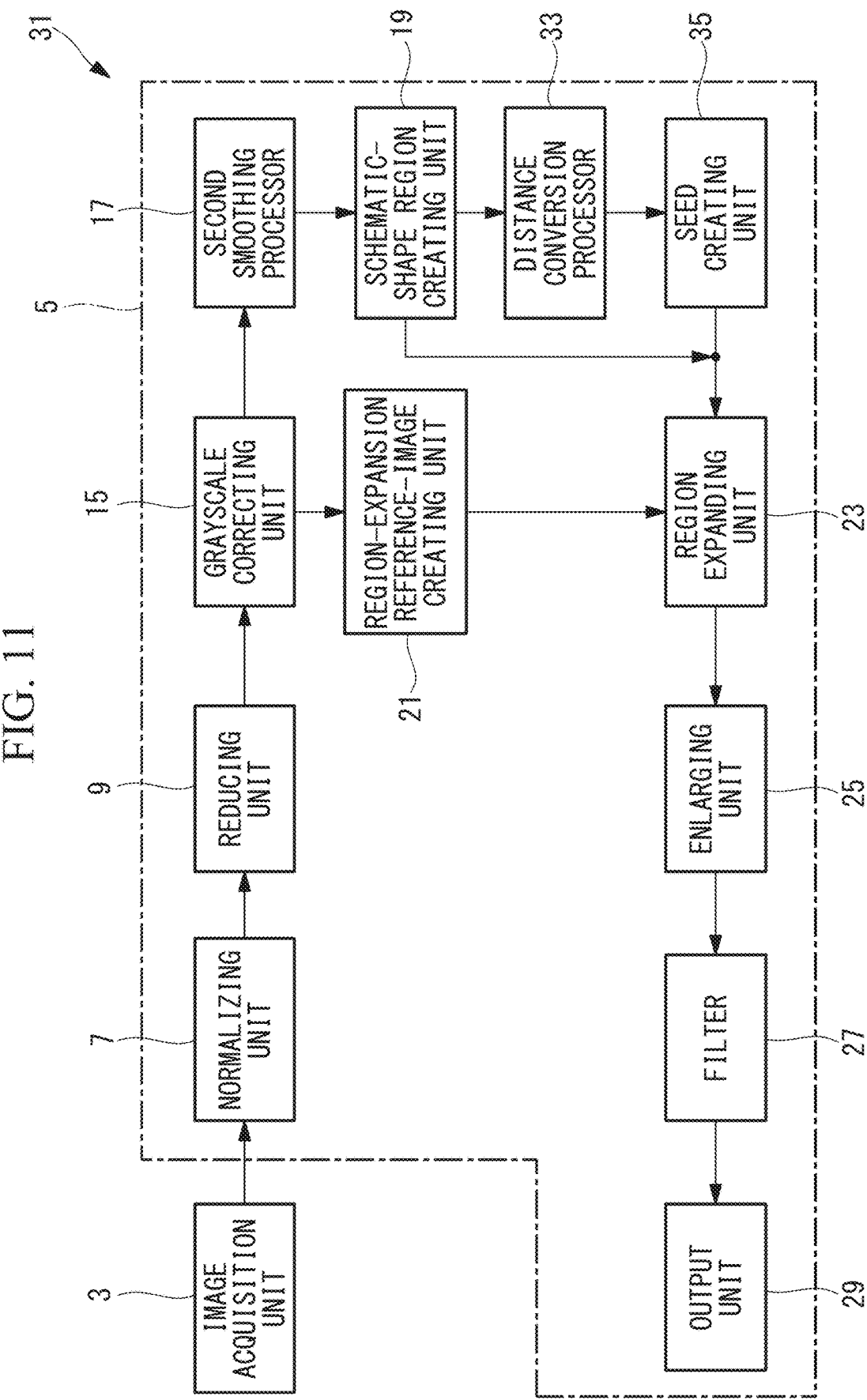
FIG. 11 is a block diagram illustrating the configuration of a cell-cluster recognition apparatus according to a second embodiment of the present invention.

As shown in FIG. 11, in a cell-cluster recognition apparatus 31 according to this embodiment, the image processing device 5 includes the normalizing unit 7, the reducing unit 9, the grayscale correcting unit 15, the region-expansion reference-image creating unit 21, the second smoothing processor 17, the schematic-shape-region creating unit 19, a distance conversion processor (distance converting unit) 33 and a seed creating unit (initial-region setting unit) 35 in place of the first smoothing processor 11 and the seed creating unit 13, the region expanding unit 23, the enlarging unit 25, the filter 27, and the output unit 29.

These units are connected to and operationally controlled by a system controller (not shown). Moreover, these units may be constituted of, for example, a central processing unit (CPU) and a storage device that stores a computational program therein, such as a random access memory (RAM) and a read-only memory (ROM). In this case, the ROM may store a cell-cluster recognition program as the computational program.

In this embodiment, the schematic-shape region created by the schematic-shape-region creating unit 19 is forwarded to the region expanding unit 23 and the distance conversion processor 33.

The distance conversion processor 33 performs a distance conversion process on the schematic-shape region (non-background region) sent from the schematic-shape-region creating unit 19. The distance conversion process involves calculating, for pixels within each schematic-shape region, a minimal distance (referred to as "distance value" hereinafter) from the region boundary (i.e., the boundary with the background region). Then, the distance conversion processor 33 creates a distance-converted image constituted by using the calculated distance value as a pixel value.

Figure 12A:
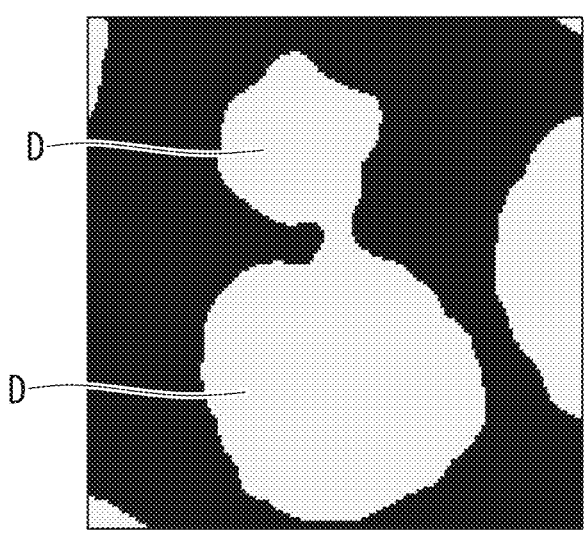
FIG. 12A illustrates a state where two schematic-shape regions are adjacent and connected to each other.
Figure 12B:
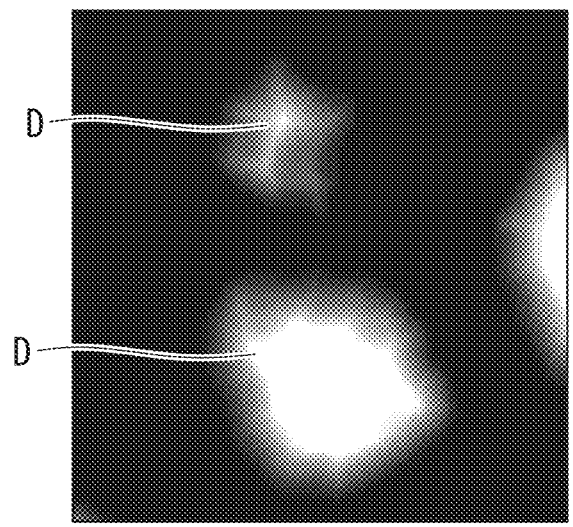
FIG. 12B is a diagram explaining that a distance value is high near the center of each schematic-shape region and that an adjacent and connected section has a low distance value.

FIGS. 12A and 12B illustrate an example of the distance conversion process performed in a case where two schematic-shape regions are adjacent to each other. In FIG. 12A, it is clear that the two schematic-shape regions are adjacent and connected to each other. In FIG. 12B, it is clear that the distance value near the center of each schematic-shape region that has undergone the distance conversion process is high, whereas the adjacent and connected section has a small distance value. In FIG. 12B, the distance value is expressed by a brightness value. In FIGS. 12A and 12B, reference sign D denotes a schematic-shape region. The distance-converted image created by the distance conversion processor 33 is forwarded to the seed creating unit 35.

Figure 12C:
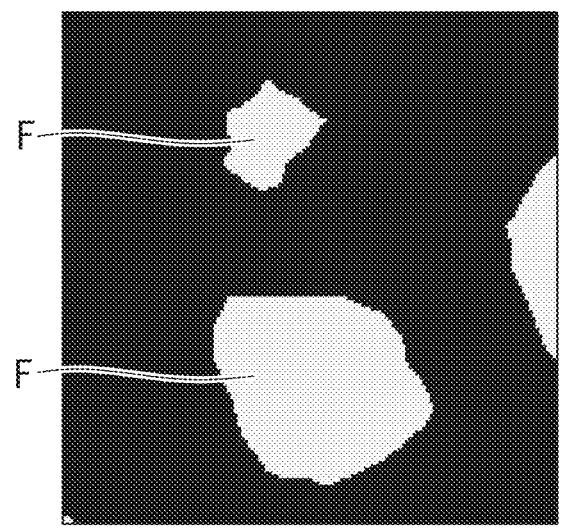
FIG. 12C illustrates an example of two seeds created from the image in FIG. 12B.

With respect to the distance-converted image sent from the distance conversion processor 33, the seed creating unit 35 determines a maximum value maxDist of distance values belonging to each spatially independent and segmented schematic-shape region. Then, the seed creating unit 35 performs threshold processing using a predetermined distance threshold value for the distance values, so as to recreate seeds (initial regions), as shown in FIG. 12C. In FIG. 12C, reference sign F denotes a seed.

FIG. 13 illustrates a one-dimensional example of threshold processing performed by the seed creating unit 35. A threshold value thDist is set such that thDist=thCoef·maxDist with reference to the maximum distance value maxDist for each independent schematic-shape region.

In this case, the coefficient thCoef is a preset coefficient for user adjustment. In FIG. 13, the ordinate axis indicates a distance value.

In FIG. 13, a threshold value thDist1 (=thCoefxmaxDist1) is set with reference to a maximum distance value maxDist1 for a schematic-shape region G1, and seeds F1 and F2 are created as a result of threshold processing. The seeds created by the seed creating unit 35 are forwarded to the region expanding unit 23.

The effects of the image processing device 5 and the cell-cluster recognition apparatus 31 having the above-described configuration, and the cell-cluster recognition method will be described below.

Figure 14:
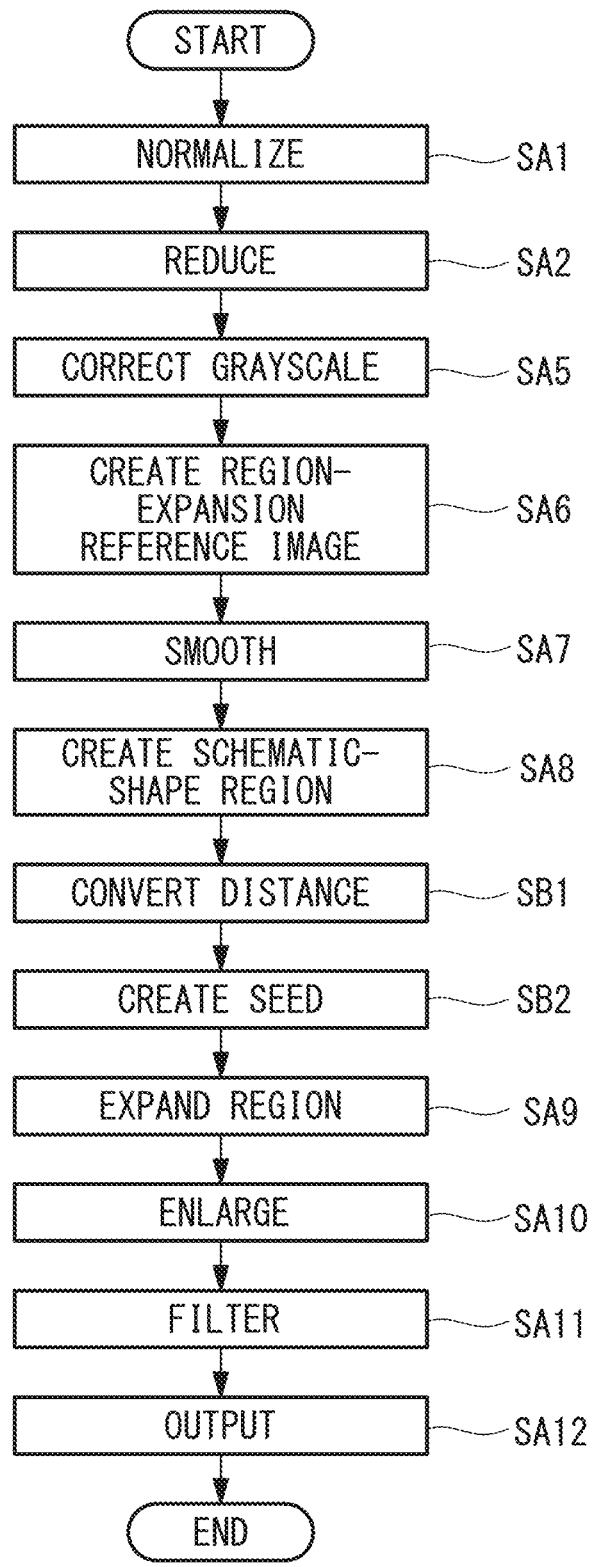
FIG. 14 is a flowchart illustrating a cell-cluster recognition method according to the second embodiment of the present invention.

As shown in a flowchart in FIG. 14, in order to recognize a cell cluster in accordance with the image processing device 5, the cell-cluster recognition apparatus 31, and the cell-cluster recognition method according to this embodiment, a three-dimensional z-stack image acquired by the image acquisition device 3 is input to the image processing device 5 as an original image signal to be region-segmented.

After step SA1 to step SA8 are performed in the image processing device 5, each schematic-shape region created by the schematic-shape-region creating unit 19 is forwarded to the region expanding unit 23 and the distance conversion processor 33.

Subsequently, the distance conversion processor 33 performs a distance conversion process on each schematic-shape region sent from the schematic-shape-region creating unit 19, so as to calculate a distance value with respect to pixels within the schematic-shape region. Then, the distance conversion processor 33 creates a distance-converted image constituted by using the calculated distance value as a pixel value (step SB1). The distance-converted image created by the distance conversion processor 33 is forwarded to the seed creating unit 35.

Subsequently, the seed creating unit 35 performs threshold processing on the distance value with respect to the distance-converted image sent from the distance conversion processor 33, so as to create seeds, as denoted by reference sign F in FIG. 12C (step SB2). The seeds created by the seed creating unit 35 are forwarded to the region expanding unit 23. Then, similar to the first embodiment, step SA9 to step SA12 are performed, whereby a region-segmented image in which the cell clusters are segmented as individual regions is generated and is stored as a region segmentation result.

As described above, in a case where a plurality of schematic-shape regions (non-background regions) are adjacent and connected to each other, the distance value from the boundary with the background region is often larger toward the center of each cluster region, whereas a section where schematic-shape regions are adjacent and connected to each other often has a small distance value. In the image processing device 5, the cell-cluster recognition apparatus 31, and the cell-cluster recognition method according to this embodiment, the regions of the cell clusters can be readily defined by the region expanding unit 23 in accordance with the seeds corresponding to the individual cell clusters set by the seed creating unit 35 based on the distance values calculated by the distance conversion processor 33. Consequently, a region of each cell cluster from which gaps between cells have been removed can be readily extracted from a cell image of a plurality of cell clusters.

In each of the above embodiments, the grayscale correcting unit 15 performs a grayscale tone correction process on pixels with low to intermediate brightness values within an image. Alternatively, the grayscale tone correction process may be performed on at least either of pixels with a low brightness value lower than or equal to a predetermined low-brightness threshold value within an image and pixels with an intermediate brightness value higher than the predetermined low-brightness threshold value but lower than or equal to a predetermined high-brightness threshold value.

Accordingly, by simply setting an appropriate predetermined low-brightness threshold value and an appropriate predetermined high-brightness threshold value, the brightness values of pixels of gaps within a cell cluster can be readily increased.

In each of the above embodiments, an image processing method is realized by hardware. Alternatively, the image processing method may be realized by a computer-executable image processing program.

Although embodiments of the present invention have been described above in detail with reference to the drawings, specific configurations are not limited to these embodiments, and design modifications are included so long as they do not depart from the scope of the invention. For example, the present invention is not limited to the above embodiments and modifications thereof and may be applied to an embodiment achieved by appropriately combining these embodiments and modifications; the invention is not limited in particular.

From the above-described embodiment, the following invention is also derived.

A first aspect of the present invention is an image processing device including: a smoothing unit that smooths a brightness value of a cell image including a plurality of cell clusters each including a plurality of cells so as to generate a smoothed image in which a gap existing between the cells in each of the cell clusters is filled in; a binarizing unit that binarizes the smoothed image into a background region and a non-background region of each cell cluster; and a region segmenting unit that segments the non-background region of the binarized smoothed image into a region for each of the cell clusters.

According to this aspect, the smoothing unit smooths the brightness value of the cell image including the plurality of cell clusters each including the plurality of cells so as to generate the smoothed image in which the gap existing between the cells in each of the cell clusters is filled in, and the binarizing unit binarizes the smoothed image into the background region and the non-background region of each cell cluster. Then, the region segmenting unit segments the non-background region of the binarized smoothed image into a region for each of the cell clusters. Consequently, a region of each cell cluster from which gaps between cells have been removed can be readily extracted from a cell image formed by capturing an image of a plurality of cell clusters.

The above aspect may further include a grayscale correcting unit that performs a grayscale tone correction process for increasing a brightness value of a pixel corresponding to the gap within each cell cluster in the cell image prior to being smoothed by the smoothing unit.

The pixel corresponding to the gap within each cell cluster in the cell image has a low to intermediate brightness value, and the grayscale correcting unit increases the brightness value of this pixel, so that the smoothing unit can fill in the gap while making the pixel value of the gap within the cell cluster even and uniform more efficiently.

In the above aspect, the cell image may be an image formed by three-dimensionally capturing an image of the plurality of cell clusters.

According to this configuration, a region of each cell cluster from which gaps between cells have been removed can be readily extracted from a three-dimensional cell image.

In the above aspect, the grayscale correcting unit performs the grayscale tone correction process on at least one of a low-brightness pixel with a brightness lower than or equal to a predetermined low-brightness threshold value and an intermediate-brightness pixel with a brightness higher than the predetermined low-brightness threshold value and lower than or equal to a predetermined high-brightness threshold value.

According to this configuration, by simply setting an appropriate predetermined low-brightness threshold value and an appropriate predetermined high-brightness threshold value, the brightness value of the pixel corresponding to the gap within the cell cluster can be readily increased.

In the above aspect, the grayscale correcting unit may perform the grayscale tone correction process on the cell image in accordance with a histogram equalization technique, and may perform the grayscale tone correction process on the cell image based on a predetermined gamma curve.

In the above aspect, the binarizing unit may set an adaptive predetermined binarization threshold value based on a distribution of pixel values of the cell image and binarize the smoothed image based on the predetermined binarization threshold value.

According to this configuration, the binarizing unit automatically sets the binarization threshold value, so that the non-background region in the smoothed image can be readily extracted.

In the above aspect, the binarizing unit may binarize the smoothed image based on a predetermined binarization threshold value set by a user.

According to this configuration, the non-background region can be extracted from the smoothed image based on a threshold value desired by the user.

In the above aspect, the region segmenting unit may include a distance converting unit that calculates a distance value from a boundary with the background region with respect to each pixel within the non-background region, an initial-region setting unit that sets an initial region corresponding to each of the cell clusters based on the distance value calculated by the distance converting unit, and a region expanding unit that expands each of the initial regions so as to define a region of each of the cell clusters.

In a case where a plurality of non-background regions are adjacent and connected to each other, the distance value from the boundary with the background region is often larger toward the center of each cluster region, whereas a section where non-background regions are adjacent and connected to each other often has a small distance value. Therefore, according to this configuration, the region expanding unit can readily define a region of each cell cluster in accordance with the initial region corresponding to each of the cell clusters set by the initial-region setting unit based on the distance value calculated by the distance converting unit.

In the above aspect, the initial-region setting unit may set a region with the distance value larger than a predetermined distance threshold value as the initial region.

According to this configuration, the initial region corresponding to each of the cell clusters can be accurately set in accordance with the predetermined distance threshold value.

The above aspect may further include a normalizing unit that converts a brightness value of each pixel to a predetermined grayscale range with respect to the cell image prior to being smoothed by the smoothing unit.

According to this configuration, the normalizing unit can facilitate subsequent processing for the cell image.

The above aspect may further include a reducing unit that reduces a resolution of the cell image prior to being smoothed by the smoothing unit based on a predetermined reduction rate; and an enlarging unit that increases a resolution of the smoothed image region-segmented for each cell cluster by the region segmenting unit.

According to this configuration, the processing rate can be increased since the smoothing unit and the binarizing unit simply have to process the cell image whose resolution has been reduced by the reducing unit.

The above aspect may further include a measuring unit that measures the size of a region of each cell cluster obtained as a result of segmenting the non-background region; and a filtering unit that removes the region of the cell cluster if the size thereof measured by the measuring unit is smaller than a predetermined region threshold value.

According to this configuration, noise extracted as a cell cluster region can be removed by the filtering unit in accordance with the size of the cell cluster region measured by the measuring unit.

In the above aspect, the smoothing performed by the smoothing unit may become stronger with increasing optical magnification when the cell image is captured.

According to this configuration, a smoothed image in which gaps within each cell cluster in the cell image are filled in more reliably can be generated, regardless of the optical magnification when the cell image is acquired.

A second aspect of the present invention is a cell-cluster recognition apparatus including: an image acquisition unit that acquires a cell image formed by capturing an image of a plurality of cell clusters each including a plurality of cells; a smoothing unit that smooths a brightness value of the cell image acquired by the image acquisition unit so as to generate a smoothed image in which a gap existing between the cells in each of the cell clusters is filled in; a binarizing unit that binarizes the smoothed image into a background region and a non-background region of each cell cluster; and a region segmenting unit that segments the non-background region of the binarized smoothed image into a region for each of the cell clusters.

According to this aspect, a region of each cell cluster from which gaps between cells have been removed can be readily extracted from a cell image formed by the image acquisition unit capturing an image of a plurality of cell clusters.

The above aspect may further include a grayscale correcting unit that performs a grayscale tone correction process for increasing a brightness value of a pixel corresponding to the gap within each cell cluster in the cell image prior to being smoothed by the smoothing unit.

According to this configuration, the grayscale correcting unit increases the brightness value of the pixel corresponding to the gap within each cell cluster in the cell image, so that the smoothing unit can make the pixel value of the gap within the cell cluster even and uniform more efficiently.

In the above aspect, the cell image may be an image formed by three-dimensionally capturing an image of the plurality of cell clusters.

According to this configuration, a region of each cell cluster from which gaps between cells have been removed can be readily extracted from a three-dimensional cell image.

A third aspect of the present invention is a cell-cluster recognition method including: a smoothing step for smoothing a brightness value of a cell image including a plurality of cell clusters each including a plurality of cells so as to generate a smoothed image in which a gap existing between the cells in each of the cell clusters is filled in; a binarizing step for binarizing the smoothed image into a background region and a non-background region of each cell cluster; and a region segmenting step for segmenting the non-background region of the binarized smoothed image into a region for each of the cell clusters.

According to this aspect, the smoothing step involves smoothing the brightness value of the cell image including the plurality of cell clusters each including the plurality of cells so as to generate the smoothed image in which the gap existing between the cells in each of the cell clusters is filled in, and the binarizing step involves binarizing the smoothed image into the background region and the non-background region of each cell cluster. Then, the region segmenting step involves segmenting the non-background region of the binarized smoothed image into a region for each of the cell clusters. Consequently, a region of each cell cluster from which gaps between cells have been removed can be readily extracted from a cell image formed by capturing an image of a plurality of cell clusters.

A fourth aspect of the present invention is a cell-cluster recognition program causing a computer to execute a process, the process including: a smoothing step for smoothing a brightness value of a cell image including a plurality of cell clusters each including a plurality of cells so as to generate a smoothed image in which a gap existing between the cells in each of the cell clusters is filled in; a binarizing step for binarizing the smoothed image into a background region and a non-background region of each cell cluster; and a region segmenting step for segmenting the non-background region of the binarized smoothed image into a region for each of the cell clusters.

According to this aspect, the process executed by the computer includes: the smoothing step involving smoothing the brightness value of the cell image including the plurality of cell clusters each including the plurality of cells so as to generate the smoothed image in which the gap existing between the cells in each of the cell clusters is filled in; the binarizing step involving binarizing the smoothed image into the background region and the non-background region of each cell cluster; and the region segmenting step involving segmenting the non-background region of the binarized smoothed image into a region for each of the cell clusters.

Consequently, by causing the computer to execute this process, a region of each cell cluster from which gaps between cells have been removed can be readily extracted from a cell image formed by capturing an image of a plurality of cell clusters.

REFERENCE SIGNS LIST 1 cell-cluster recognition apparatus
3 image acquisition device (image acquisition unit)
5 image processing device
7 normalizing unit
9 reducing unit
11 first smoothing processor (smoothing unit)
13 seed creating unit (binarizing unit)
15 grayscale correcting unit
17 second smoothing processor (smoothing unit)
23 region expanding unit (region segmenting unit)
25 enlarging unit
27 filter (measuring unit, filtering unit)
33 distance conversion processor (distance converting unit)
35 seed creating unit (initial-region setting unit)
SA3, SA7 smoothing step
SA4 seed creating step (binarizing step)
SA9 region expanding step (region segmenting step)
C cell
S spheroid (cell cluster)

The invention claimed is:

1. An image processing device comprising:
a processor comprising hardware, the processor configured to:
smooth a brightness value of a cell image including a plurality of cell clusters each including a plurality of cells so as to generate a smoothed image in which a gap existing between the cells in each of the cell clusters is filled in;
binarize the smoothed image into a background region and a non-background region of each cell cluster, wherein the non-background region includes a plurality of schematic-shape-regions, and the plurality of schematic-shape-regions are spatially independent; and
segment each of the plurality of schematic-shape-regions in the non-background region of the binarized smoothed image into a region for each of the cell clusters.

2. The image processing device according to claim 1, wherein the processor is configured to perform a grayscale tone correction process for increasing a brightness value of a pixel corresponding to the gap within each cell cluster in the cell image prior to being smoothed.

3. The image processing device according to claim 1, wherein the cell image is an image formed by three-dimensionally capturing an image of the plurality of cell clusters.

4. The image processing device according to claim 2, wherein the processor is configured to perform the grayscale tone correction process on at least one of a low-brightness pixel with a brightness lower than or equal to a predetermined low-brightness threshold value and an intermediate-brightness pixel with a brightness higher than the predetermined low-brightness threshold value and lower than or equal to a predetermined high-brightness threshold value.

5. The image processing device according to claim 2, wherein the processor is configured to perform the grayscale tone correction process on the cell image in accordance with a histogram equalization technique.

6. The image processing device according to claim 2, wherein the processor is configured to perform the grayscale tone correction process on the cell image based on a predetermined gamma curve.

7. The image processing device according to claim 1, wherein the processor is configured to set an adaptive predetermined binarization threshold value based on a distribution of pixel values of the cell image and binarize the smoothed image based on the predetermined binarization threshold value.

8. The image processing device according to claim 1, wherein the processor is configured to binarize the smoothed image based on a predetermined binarization threshold value set by a user.

9. The image processing device according to claim 1, wherein the processor is configured to:
calculate a distance value from a boundary with the background region with respect to each pixel within the non-background region;
set an initial region corresponding to each of the cell clusters based on the calculated distance value; and
expand each of the initial regions so as to define a region of each of the cell clusters.

10. The image processing device according to claim 9, wherein the processor is configured to set a region with the distance value larger than a predetermined distance threshold value as the initial region.

11. The image processing device according to claim 1, wherein the processor is configured to convert a brightness value of each pixel to a predetermined grayscale range with respect to the cell image prior to being smoothed.

12. The image processing device according to claim 1, wherein the processor is configured to:
reduce a resolution of the cell image prior to being smoothed based on a predetermined reduction rate; and
increase a resolution of the smoothed image region-segmented for each cell cluster.

13. The image processing device according to claim 1, wherein the processor is configured to:
measure the size of a region of each cell cluster obtained as a result of segmenting the non-background region; and
remove the region of the cell cluster if the measured size thereof is smaller than a predetermined region threshold value.

14. The image processing device according to claim 1, wherein the smoothing becomes stronger with increasing optical magnification when the cell image is captured.

15. A cell-cluster recognition apparatus comprising:
an image acquisition device that is configured to acquire a cell image formed by capturing an image of a plurality of cell clusters each including a plurality of cells; and
an image processing device that includes a processor configured to:
smooth a brightness value of the cell image acquired by the image acquisition device so as to generate a smoothed image in which a gap existing between the cells in each of the cell clusters is filled in;

binarize the smoothed image into a background region and a non-background region of each cell cluster, wherein the non-background region includes a plurality of schematic-shape-regions, and the plurality of schematic-shape-regions are spatially independent; and segment each of the plurality of schematic-shape-regions in the non-background region of the binarized smoothed image into a region for each of the cell clusters.

16. The cell-cluster recognition apparatus according to claim 15, wherein the processor is configured to perform a gray-scale tone correction process for increasing a brightness value of a pixel corresponding to the gap within each cell cluster in the cell image prior to being smoothed.

17. The cell-cluster recognition apparatus according to claim 15, wherein the cell image is an image formed by three-dimensionally capturing an image of the plurality of cell clusters.

18. A cell-cluster recognition method comprising:

smoothing, by an image processor, a brightness value of a cell image including a plurality of cell clusters each including a plurality of cells so as to generate a smoothed image in which a gap existing between the cells in each of the cell clusters is filled in;

binarizing, by the image processor, the smoothed image into a background region and a non-background region of each cell cluster, wherein the non-background region includes a plurality of schematic-shape-regions, and the plurality of schematic-shape-regions are spatially independent; and segmenting, by the image processor, the non-background region of the binarized smoothed image into a region for each of the cell clusters.

19. A non-transitory computer-readable medium having a cell-cluster recognition program stored thereon, the cell-cluster recognition program causing a computer to execute functions of:

smoothing a brightness value of a cell image including a plurality of cell clusters each including a plurality of cells so as to generate a smoothed image in which a gap existing between the cells in each of the cell clusters is filled in;

binarizing the smoothed image into a background region and a non-background region of each cell cluster, wherein the non-background region includes a plurality of schematic-shape-regions, and the plurality of schematic-shape-regions are spatially independent; and segmenting each of the plurality of schematic-shape-regions in the non-background region of the binarized smoothed image into a region for each of the cell clusters.

* * * * *